United States Patent [19]

Horton et al.

[11] Patent Number: 4,881,671
[45] Date of Patent: Nov. 21, 1989

[54] SELF-DUSTING INSECTICIDE BOOT ATTACHMENT

[76] Inventors: Robert D. Horton, Rte. 3, Box 3456, Athens, Tex. 75751; Doyle J. Farley, R.R. #1, Box 8-2, Murchison, Tex. 75778

[21] Appl. No.: 185,883
[22] Filed: Apr. 25, 1988
[51] Int. Cl.$^4$ .............................................. A45C 13/30
[52] U.S. Cl. .................................. 224/222; 224/252; 43/132.1; 43/131
[58] Field of Search ............... 224/222, 219, 229, 267, 224/252, 269, 268; 119/159; 239/36; 36/132, 136; 401/6; 43/131, 132.1

[56] References Cited

U.S. PATENT DOCUMENTS

| | | | |
|---|---|---|---|
| 765,472 | 7/1904 | Gasaway et al. | 43/131 |
| 1,203,590 | 11/1916 | Day | 43/132.1 |
| 1,780,407 | 11/1930 | Smith | 224/222 |
| 4,461,030 | 7/1984 | Knudsen | 224/222 |
| 4,597,218 | 7/1986 | Friemel et al. | 43/131 |
| 4,601,418 | 7/1986 | Gruzensky | 224/222 |
| 4,722,477 | 2/1988 | Floyd | 239/36 |

Primary Examiner—Linda J. Sholl
Attorney, Agent, or Firm—Leon Gilden

[57] ABSTRACT

A self-dusting porous pouch for securement to an associated boot is set forth to prevent crawling insects, such as ticks and the like, from passing upwardly to an individual from ground level during outdoor activity. The self-dusting boot attachment has secured to the porous pouch a Velcro strap for surroundingly encompassing a boot with associated boot hooks attached at an inside surface of the pouch for securement overlying an associated boot upper perimeter for maintaining the apparatus at a predetermined orientation relative to the boot.

3 Claims, 2 Drawing Sheets

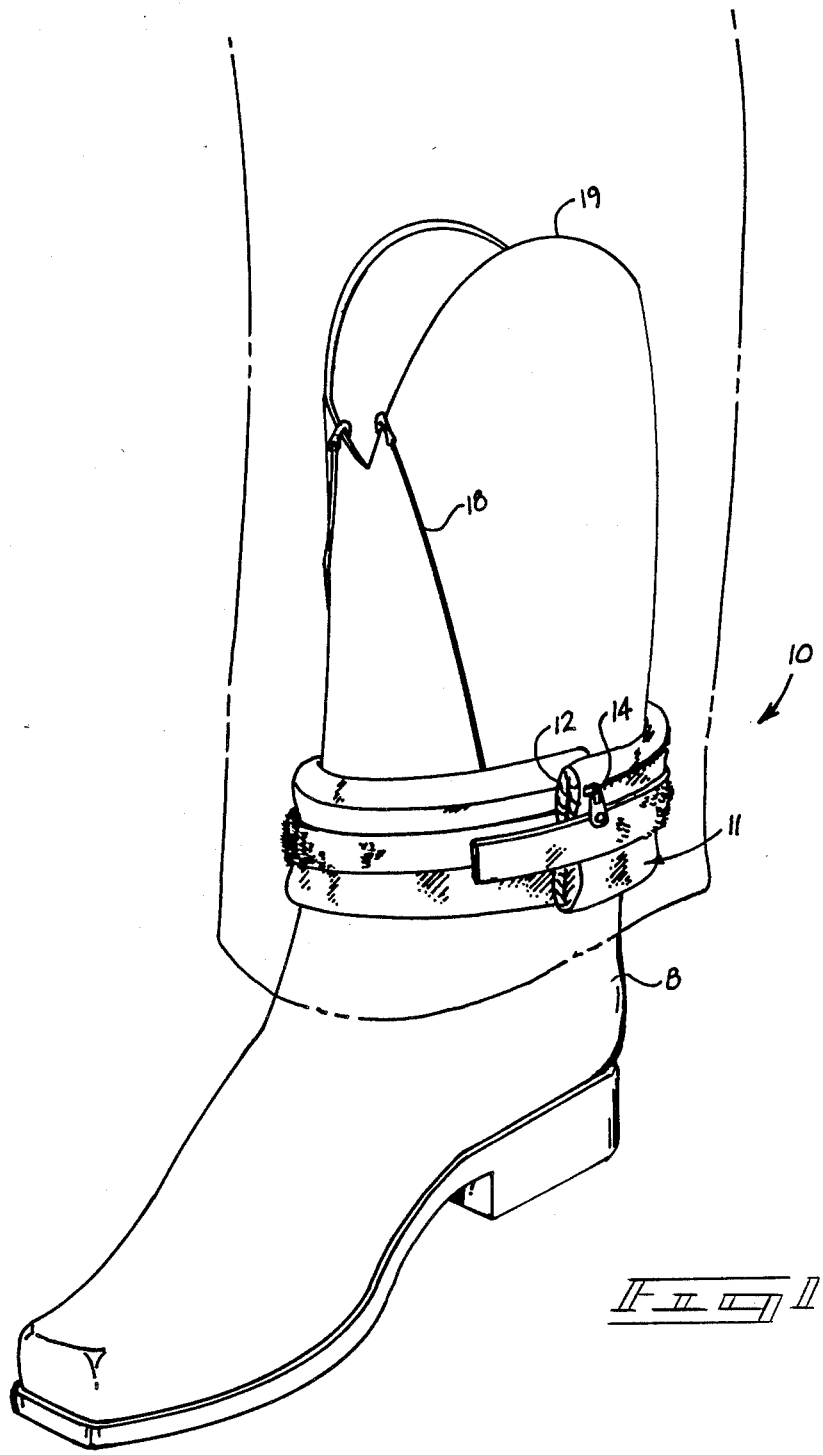

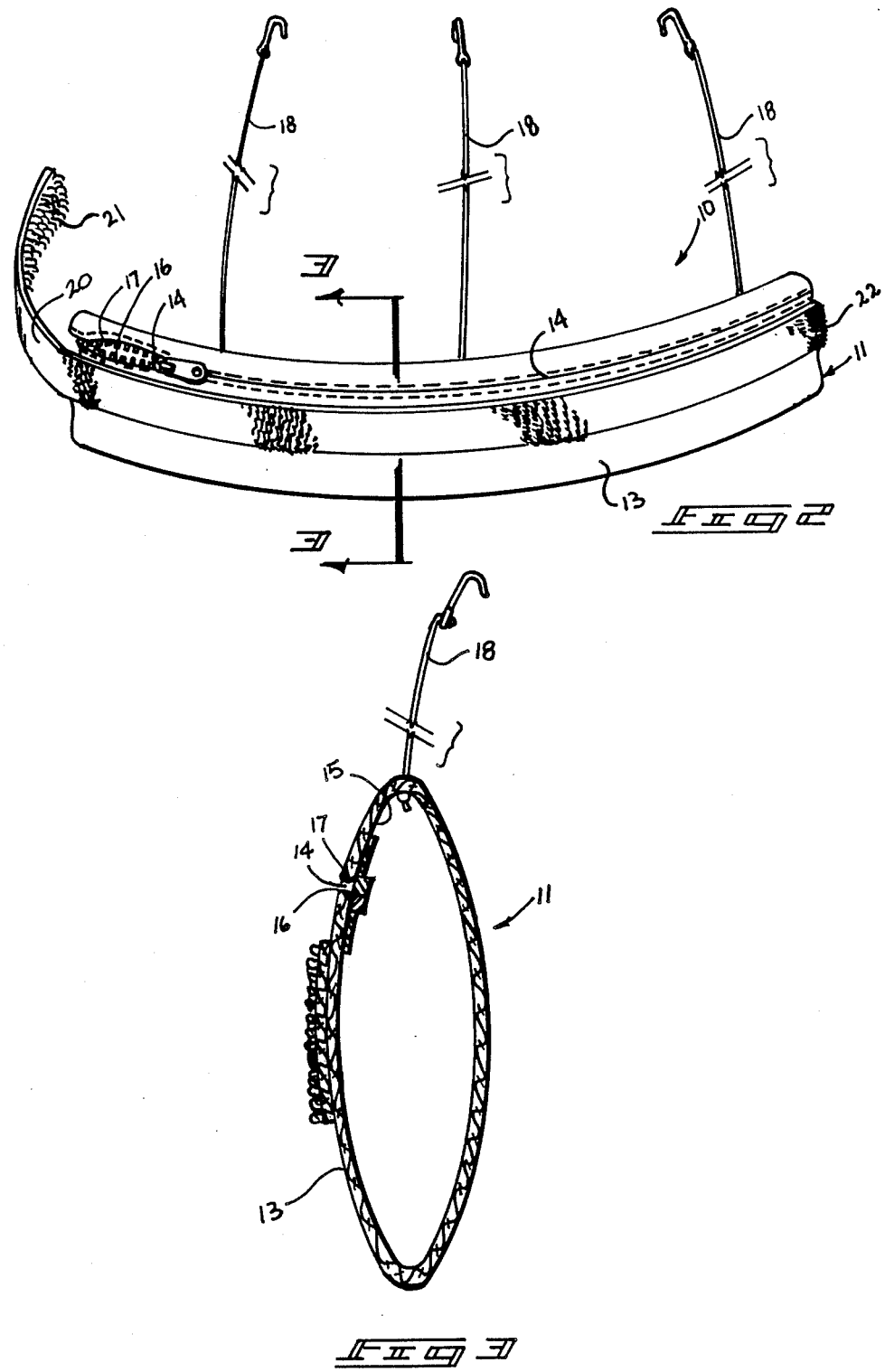

SELF-DUSTING INSECTICIDE BOOT ATTACHMENT

BACKGROUND OF THE INVENTION

1. Field of the Invention

The present invention relates to insect dusting devices and more particularly pertains to a new and improved self-dusting insecticide dispersing apparatus for boot attachment which is readily and effectively securable about an associated boot for prevention of ground traversing insects from travel upwardly about an individual.

2. Description of the Prior Art

The use of insect dusting apparatus is well known in the prior art. As may be appreciated, these devices have normally been of elaborate construction for association with animals and livestock and the like. Application to individuals have not been developed due to the practice of individuals of applying a quantity of dust to themselves as desired, but this practice has not been effective during the course of many outdoor activities such as hiking, hunting, etc. where it is inconvenient or awkward to do so.

Examples of prior art apparatus to provide insecticide dusting includes U.S. Pat. No. 3,971,342 to Cortner is typical of livestock insecticide applicators wherein at least one inner porous bag has a filling means and a flexible protective material surrounding and overlying the bag wherein the inner bag contacts and transfers dust therefrom to an animal due to animal agitation. While an effective apparatus for applying dust to livestock, the Cortner patent is of a relatively bulky, complex, and inappropriate device for use by humans.

U.S. Pat. No. 3,901,195 to Stewart sets forth a weatherproof livestock dusting bag whereupon an animal engaging the overlying bag is dusted therefrom wherein a conical weather protective shield is in an overlying relationship to the dusting portion of the bag to protect the contents from adverse effects of weather. The Stewart patent is typical of exterior livestock dusting equipment utilized in the ranching trade.

U.S. Pat. No. 3,847,122 to Gould sets forth a refillable livestock dispensing bag that may be suspended from a supporting device to dispense insecticide therein when an animal rubs or abuts the bag, the bag is not intended for securement to the animal but to a device that an animal may come in contact with. The patent is of interest relative to the nature and types of insecticide dusting equipment available.

U.S. Pat. No. 3,777,716 to Cortner is another example of a self-dusting insecticide bag with an exterior protective covering and an interior porous magazine whereupon contact by an animal enables the dust to dispense onto said animal for protection. The Cortner patent in this instance is merely another refined type of livestock dusting apparatus.

U.S. Pat. No. 2,762,158 to Duffey sets forth an applicator mitt wherein two substantially rectangular pieces of cloth are sewn together with a third piece of cloth sewn to permit insertion of a hand into the mitt, and further secure insecticide within the bag for application by a pet owner to an associated pet. The patent is of interest relative to an applicator that may be secured to a portion of a human's anatomy, but is of a structure and function relatively remote to that of the instant invention.

U.S. Pat. No. 2,462,689 to Staretz sets forth a collar for attachment to a dog or cat whereupon the collar has included therein orifices for enabling dispersing of insecticide to the associated animal.

U.S. Pat. No. 2,349,713 Finch is another example of an animal attached collar for dispensing of insecticide to an associated animal.

As such, it may be appreciated that there is a continuing need for a self-dusting insecticide dispensing apparatus which may be attached to a boot to enable efficient, secure, and effective prevention of land traversing insects from traveling about an individual via shoes or boots.

SUMMARY OF THE INVENTION

In view of the foregoing disadvantages inherent in the known types of insect dusting apparatus now present in the prior art, the present invention provides an self-dusting insecticide boot attachment wherein the same may be compactly secured about a boot when in use and can further be easily and efficiently worn during such periods. As such, the general purpose of the present invention, which will be described subsequently in greater detail, is to provide a new and improved self-dusting insecticide boot attachment which has all the advantages of the prior art insecticide dusting apparatus and none of the disadvantages.

To attain this, the present invention comprises a selectively securable pouch formed of porous material to enable insecticide dust secured therein to be directed through the pores of the pouch wherein an associated zipper enables ready filling of said pouch. Further, the pouch has secured thereto an overlying Velcro securement strap positioned longitudinally of the pouch with additional boot hooks secured to an interior surface of the pouch for securement about an upper edge of an associated boot. The pouch is of a length for complete surface encircling of an associated boot for prevention of insect travel upon the boot.

My invention resides not in any one of these features per se, but rather in the particular combination of all of them herein disclosed and claimed and it is distinguished from the prior art in this particular combination of all of its structures for the functions specified.

There has thus been outline, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the forgoing abstract is of enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved self-dusting insecticide boot attachment which has all the advantages of the prior art selfdusting insecticide boot attachments and none of the disadvantages.

It is another object of the present invention to provide a new and improved self-dusting insecticide boot attachment which may be easily and efficiently manufactured and marketed.

It is a further object of the present invention to provide a new and improved self-dusting insecticide boot attachment which is of a durable and reliable construction.

An even further object of the present invention is to provide a new and improved self-dusting insecticide boot attachment which is susceptible of a low cost of manufacture with regard to both materials and labor, and which accordingly is then susceptible of low prices of sale to the consuming public, thereby making such self-dusting insecticide boot attachment economically available to the buying public.

Still yet another object of the present invention is to provide a new and improved self-dusting insecticide boot attachment which provides in the apparatuses and methods of the prior art some of the advantages thereof, while simultaneously overcoming some of the disadvantages normally associated therewith.

Still another object of the present invention is to provide a new and improved self-dusting insecticide boot attachment wherein the same provides a zippered pouch of length approximately equal to or greater than the encircling perimeter of an associated boot.

Yet another object of the present invention is to provide a new and improved self-dusting insecticide boot attachment wherein said attachment is provided with boot hooks for securement to an upper perimeter edge of an associated boot with an overlying Velcro securement strap positioned overlying said pouch to maintain said pouch in contiguous contact with a boot during use.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention positioned about an associated boot.

FIG. 2 is an isometric illustration of the instant invention illustrating its various parts, configuration, and their relationship.

FIG. 3 is an orthographic view taken in elevation along the lines 3—3 of FIG. 2 in the direction indicated by the arrows.

DESCRIPTION OF THE PREFERRED EMBODIMENT

With reference now to the drawings, and in particular to FIGS. 1 to 3 thereof, a new and improved self-dusting insecticide boot attachment embodying the principles and concepts of the present invention and generally designated by the reference numeral 10 will be described.

More specifically, it will noted that the self-dusting insecticide boot attachment apparatus 10 essentially comprises an elongate pouch 11 formed of a length to equal or exceed an outer perimeter surface of an associated boot, as illustrated in FIG. 1. The width of the pouch is typically between two and four inches to effect an adequate surface dusting of the associated boot "B". The fabric may be formed of any suitable material, such as burlap, nylon, and the like, where the essential requirement is that the porosity be adequate to enable transmission and distribution of insecticide dust stored within the pouch 11 to be distributed upon the associated boot "B" where pouch 11 contacts the boot therebelow. In this manner, insecticide dust does not contact the user of the apparatus and therefore various chemicals, such as sulphur based chemicals or insecticide chemicals of greater potency without adverse effect to a user.

The pouch 11 is formed with end seams 12 at either end thereof with a coextensive zipper 14 formed at an upper exterior surface of the pouch. The zipper is secured either by sewing or adhesives to an interior surface 15 to associate lower edge 16 and upper edge 17 of pouch 11 to enable effective and complete filling of the pouch 11 prior to use.

Additionally, a plurality of boot hooks 18 are secured to a rear surface 18a of pouch 11 at the opposite side to the zipper 14 for looping about an upper terminal edge 19 of an associated boot to assist in maintaining the vertical orientation of the apparatus 10 to a predetermined location, as illustrated in FIG. 1.

A Velcro strap 20 formed with hook fasteners 21 to be selectively securable to loop fasteners 22 is secured to the exterior surface of the pourch 11 immediately below the zipper 14 to maintain the apparatus 10 securedly and snugly against the boot "B" for comfortable use thereof.

It should be appreciated therefore that land traversing insects, such as ticks and the like, are prevented from traveling about the lower surface of boot "B" at or below positioning of the apparatus 10 and are accordingly prevented from movement upwardly about a user thereof to prevent undesirable association with such insects.

As to the manner of usage and operation of the present invention, the same should be apparent from the above description. Accordingly, no further discussion relative to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United states is as follows:

1. A self-dusting boot apparatus for the distribution of insect repelling powder about a boot for use in combination with said boot wherein said boot comprises a lower surface and an integral upper vertical surface terminating in an upper vertical edge, said apparatus comprising, a pouch means for selective attachment about the upper vertical surface of said boot and said pouch means including a selective opening means for filling said pouch means with the insect repelling powder, and strap means including fastening elements integrally secured to an exterior surface of said pouch means for encircling securement of said pouch means to said boot about said upper vertical surface, and wherein said fastening elements include hook and loop fasteners with respective hook and loop fasteners at opposed terminal ends of said strap means, and wherein said strap means is secured to said pouch means immediately below said selective opening means, and wherein said selective opening means includes a zipper positioned between opposed coextensive terminal ends of said pouch means to an interior surface of said pouch means, and wherein said pouch means is of a linear dimension equal to or greater than a permieter surface about said upper vertical surface of the boot, and wherein a plurality of elongate boot hooks are secured to a rear surface of said pouch means at lower ends of the hook on an opposite side of said pouch means to that having secured thereto said zipper and said strap means to enable securement of the hooks to the upper edge of the boot wherein each of the hooks further includes a "U" shaped upper end for overlying securement to the upper edge of the boot to enable said pouch means to be positioned and arranged for attachment to the upper edge of said boot.

2. A self-dusting boot apparatus as set forth in claim 1 wherein said pouch means is approximately two to five inches in width for effective application of the insect repelling powder to said boot.

3. A self-dusting boot apparatus as set forth in claim 2 wherein said pouch is three inches in width.

* * * * *